United States Patent
Stay et al.

(10) Patent No.: US 7,218,192 B2
(45) Date of Patent: May 15, 2007

(54) LOCKABLE FASTENER AND CIRCUIT BREAKER EMPLOYING THE SAME

(75) Inventors: Amelia M. Stay, Monaca, PA (US); David A. Parks, Baden, PA (US); David E. Little, Midland, PA (US); David H. Groves, Monaca, PA (US)

(73) Assignee: Eaton Corporation, Cleveland, OH (US)

( * ) Notice: Subject to any disclaimer, the term of this patent is extended or adjusted under 35 U.S.C. 154(b) by 308 days.

(21) Appl. No.: 10/958,172

(22) Filed: Oct. 1, 2004

(65) Prior Publication Data

US 2006/0071745 A1 Apr. 6, 2006

(51) Int. Cl.
*H01H 75/00* (2006.01)
*H01H 3/00* (2006.01)

(52) U.S. Cl. .................. 335/6; 335/189; 335/190; 200/244

(58) Field of Classification Search ........ 411/276–285, 411/319, 335, 336; 335/6, 16, 189, 190; 200/244
See application file for complete search history.

(56) References Cited

U.S. PATENT DOCUMENTS

| | | | | |
|---|---|---|---|---|
| 587,110 A | * | 7/1897 | Temple | ................ 411/336 |
| 1,737,317 A | * | 11/1929 | Martin | ................ 411/294 |
| 4,768,908 A | * | 9/1988 | Fauchet | ................ 411/283 |
| 6,052,047 A | | 4/2000 | Malingowski et al. | |
| 6,140,897 A | | 10/2000 | Mueller et al. | |
| 6,208,229 B1 | | 3/2001 | Zindler et al. | |
| 6,232,855 B1 | | 5/2001 | Malingowski et al. | |
| 6,275,126 B1 | | 8/2001 | Martelli et al. | |
| 6,281,771 B1 | | 8/2001 | Turner et al. | |
| 6,747,534 B1 | | 6/2004 | Mueller et al. | |

* cited by examiner

*Primary Examiner*—Ramon M. Barrera
(74) *Attorney, Agent, or Firm*—Mark J. Moran

(57) ABSTRACT

A lockable fastener connects together a plurality of components of a circuit breaker and maintains electrical conductivity between the components while permitting relative movement therebetween. The lockable fastener includes a first clinch nut member and a second clinch bolt member. The clinch nut member includes a threaded cavity formed therein, a side having opening therein, and a passageway between the side at the opening and a surface proximate the threaded cavity. The clinch bolt member includes a threaded shank. At least a portion of the threaded shank is threadably receivable in the threaded cavity of the clinch nut member, in order to axially align the clinch nut and clinch bolt members. The clinch nut and clinch bolt members are adapted to be locked by deformation of the surface of the clinch nut member to prevent loosening of the members.

2 Claims, 15 Drawing Sheets

LOCKABLE FASTENER AND CIRCUIT BREAKER EMPLOYING THE SAME

CROSS-REFERENCE TO RELATED APPLICATIONS

This application is related to commonly assigned, concurrently filed:

U.S. patent application Ser. No. 10/957,201, filed Oct. 1, 2004, entitled "Support Structure For A Circuit Interrupter Latch And Circuit Breaker Employing The Same";

U.S. patent application Ser. No. 10/975,544, filed Oct. 1, 2004, entitled "Circuit Breaker Including A Latchable Cradle And A Cross Bar Adapted To Move In An Arcuate Path Away From Primary And Secondary Latches"; and U.S. Pat. No. 7,021,492 issued Mar. 14, 2006, entiled "Circuit Breaker Including Rotary Interlock For Secondary Cover".

This application is also related to commonly assigned, co-pending:

U.S. patent application Ser. No. 10/742,594, filed Dec. 19, 2003, entitled "Lockable Fastener For Circuit Breaker".

BACKGROUND OF THE INVENTION

1. Field of the Invention

The present invention relates generally to circuit interrupters and, more particularly, to a fastener that can be employed in a circuit breaker application, the fastener being lockable to resist release thereof. The invention also relates to a circuit breaker employing a lockable fastener.

2. Background Information

Circuit interrupters, such as circuit breakers, are employed in diverse capacities in power distribution systems. A circuit breaker includes, for example, a line conductor, a load conductor, a fixed contact and a movable contact, with the movable contact being movable into and out of electrically conductive engagement with the fixed contact to switch the circuit breaker between an on or closed position and an off or open position, or between the on or closed position and a tripped position. The fixed contact is electrically conductively engaged with one of the line and load conductors, and the movable contact is electrically conductively engaged with the other of the line and load conductors.

The movable contact is typically disposed on a movable contact arm. In some circuit breakers, the movable arm may be disposed upon a structure within the interior of the circuit breaker and a flexible shunt is employed to electrically conductively connect the movable arm with its associated conductor. In other circuit breakers, it may be desirable to pivotably mount the movable arm directly on the associated conductor. In such a circumstance, a fastener may be employed in making the pivotable connection between the movable arm and the conductor. The fastener must provide sufficient contact forces between the conductor and the movable arm to provide electrically conductive engagement therebetween; however, the contact forces cannot be so great as to cause so much friction between the movable arm and the conductor that the pivoting action of the arm is impaired. It, thus, has been known to provide a threaded fastener for fastening a movable contact arm to a conductor, with the threaded fastener being tightened to a highly specific level of torque that achieves an agreeable balance between electrical conductivity and friction.

Such devices have not, however, been without limitation. It is understood that repeated opening and closing of the contacts, whereby the movable arm pivots between a closed position and an open position, can result in gradual loosening of the threaded fastener that pivotably mounts the movable arm to the conductor. Such loosening changes the torque of the fastener and, thus, the conductive/frictional characteristics of the pivotable connection between the movable arm and the conductor, which is undesirable.

It is also known that space is extremely limited within the confines of a circuit breaker. As such, any solution to the fastening problem must occupy a minimum of space.

It is, thus, desired to provide an improved fastener that is reliably lockable and that occupies a minimum of space.

Accordingly, there is room for improvement in lockable fasteners and in circuit breakers employing lockable fasteners.

SUMMARY OF THE INVENTION

These needs and others are met by the present invention, which provides a lockable fastener that connects together a plurality of components of a circuit interrupter and maintains electrical conductivity between the components while permitting relative movement therebetween.

In accordance with one aspect of the invention, a lockable fastener for connecting together a plurality of components of a circuit interrupter and for maintaining electrical conductivity between the components while permitting relative movement therebetween comprises: a first member including a threaded cavity formed therein, a side having opening therein, and a passageway between the side at the opening and a surface proximate the threaded cavity; and a second member including a threaded shank, at least a portion of the threaded shank being threadably receivable in the threaded cavity of the first member, in order to axially align the first member and the second member, wherein the first member and the second member are adapted to be locked by deformation of the surface of the first member to prevent loosening of the first and second members.

The threaded shank may include a plurality of threads, and the surface of the first member may be adapted to be deformed to engage at least one of the threads.

The surface of the first member may be adapted to be deformed by compression or by being wedged to engage at least one of the threads.

The passageway may be normal to the threaded cavity.

The first member may be a clinch nut, and the second member may be a clinch bolt.

As another aspect of the invention, a circuit breaker comprises: a line conductor; a load conductor; a fixed contact being electrically conductively disposed on one of the line and load conductors; a movable contact; an operating mechanism comprising a movable arm, the movable contact being electrically conductively disposed on the movable arm; and a lockable fastener comprising: a first member including a threaded cavity formed therein, a side having opening therein, and a passageway between the side at the opening and a surface proximate the threaded cavity, and a second member including a threaded shank, at least a portion of the threaded shank being threadably received in the threaded cavity of the first member, in order to axially align the first member and the second member, wherein the first member and the second member are locked by deformation of the surface of the first member to prevent loosening of the first and second members, and wherein the movable arm is electrically conductively connected with and movably mounted to the other of the line and load conductors with the lockable fastener.

The movable arm may include at least one first spring washer disposed adjacent the first member of the lockable fastener and at least one second spring washer disposed adjacent the second member of the lockable fastener.

The operating mechanism may further comprise a cam carrier including a first side having an opening and a second side having an opening. The first member may pass through the opening of the first side and the second member may pass through the opening of the second side.

The operating mechanism may further comprise a first side plate including a first opening, and a second side plate including a second opening. The first member may pass through the first opening, and the second member may pass through the second opening.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "bushing" means a removable or non-removable, cylindrical or non-cylindrical lining for an opening of one component, such as a side plate, employed to resist abrasion and/or to reduce friction with another component, such as the tab of a latch member.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The present invention is described in association with a three-pole circuit breaker 10, although the invention is applicable to a wide range of circuit interrupters including one or more poles. Examples of circuit breakers are disclosed in U.S. Pat. Nos. 6,747,534 and 6,140,897, which are incorporated by reference herein.

Figure 1:
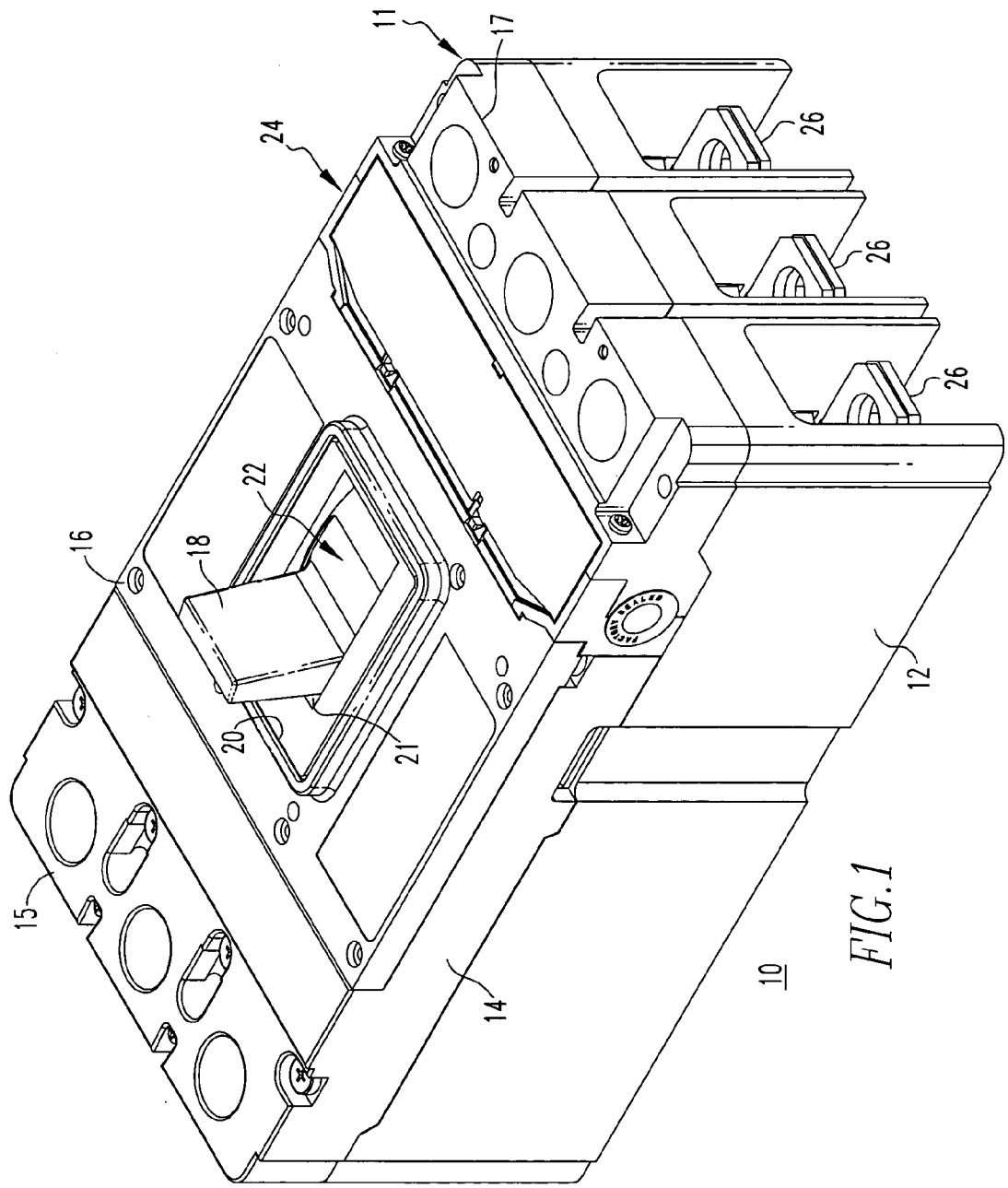
FIG. 1 is an isometric view of a circuit breaker in accordance with the present invention.
Figure 2:
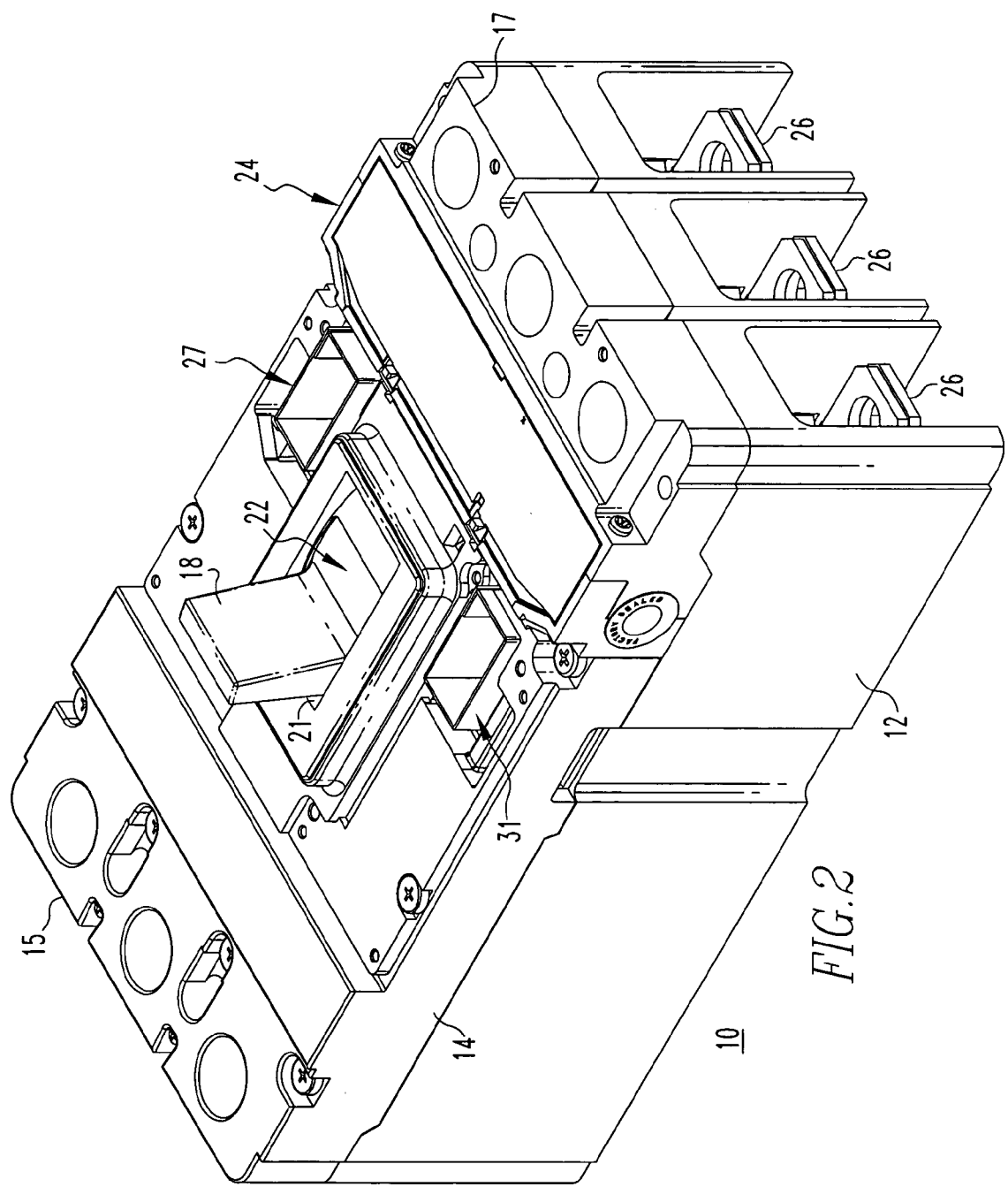
FIG. 2 is an isometric view of the circuit breaker of FIG. 1 with a secondary cover removed.

Referring to FIGS. 1 and 2, there is shown a molded case circuit breaker or interrupter 10 having a main base 12 and a primary cover 14. Attached to the primary cover 14 is a secondary cover 16 (as shown in FIG. 1; the secondary cover 16 is removed in FIG. 2). A handle 18 extends through a secondary escutcheon 20 in the secondary cover 16 and aligned primary escutcheon 21 in the primary cover 14. An operating mechanism 22 is interconnected with the handle 18 and is adapted to open and close separable main contacts 23 (FIG. 3) in a manner which will be described below. This circuit breaker 10 includes a line end 15, a load end 17 and a removable trip unit 24. There are also depicted load terminals 26, a right side accessory region or pocket 27 (FIG. 2) and a left side accessory pocket or region 31 (FIG. 2).

Figure 3:
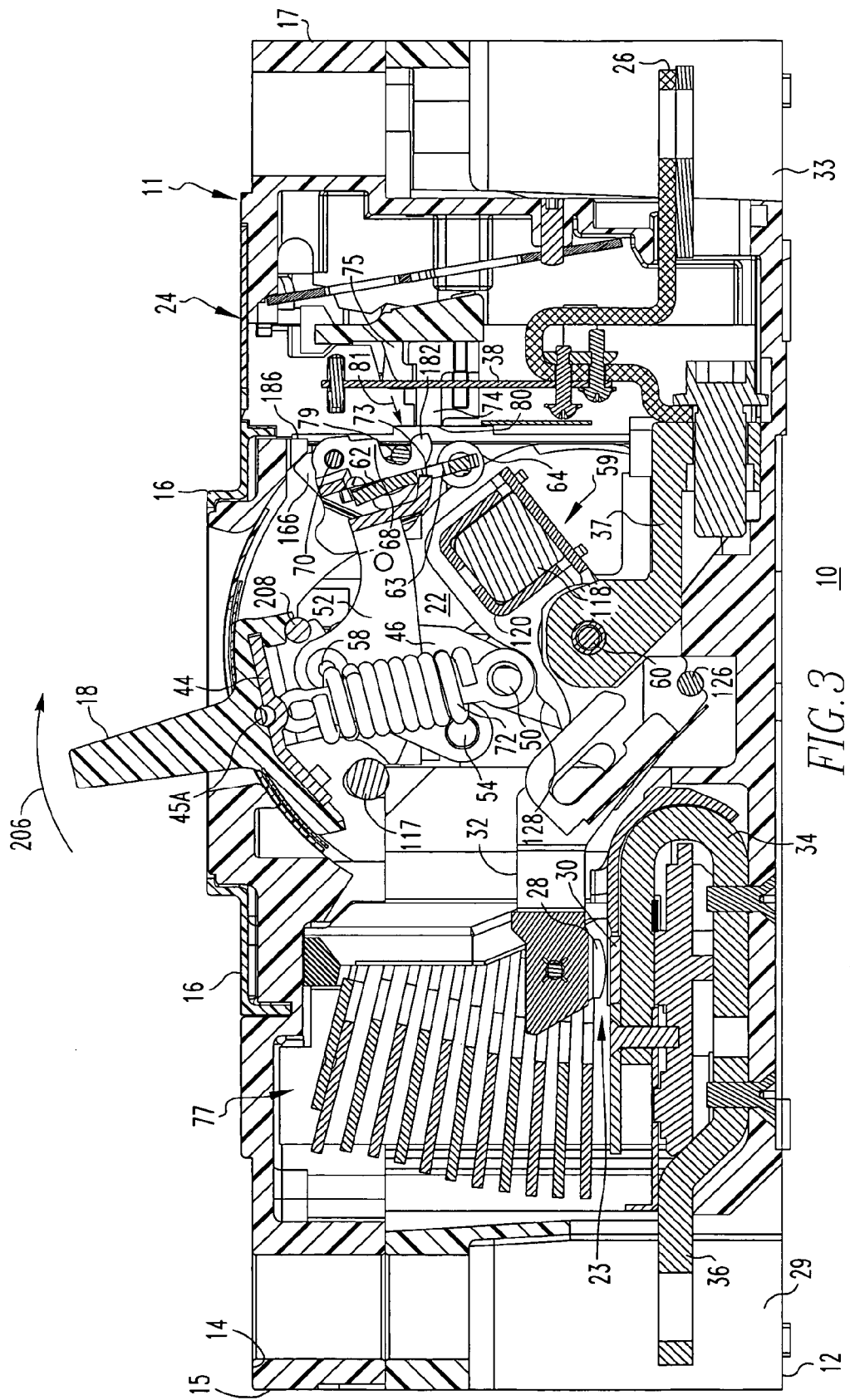
FIG. 3 is a cut away vertical elevation section of the circuit breaker of FIG. 1, depicting the separable contacts in the closed position.

Referring now more specifically to FIG. 3, there are depicted a separable movable contact 28 disposed upon a movable contact arm 32 and a fixed contact 30 disposed upon a fixed contact support or U-shaped member 34. Line terminal 36 is disposed to the left in FIG. 3, for example, at the line end 15 of the circuit breaker 10 in a terminal cave or pocket 29. The load terminal 26 is disposed to the right in FIG. 3, for example, in a load terminal cave or pocket 33. To the left on the line terminal 36 is disposed a line terminal collar (not shown), and to the right is provided a load terminal-contact arm conductor 37. The conductor 37 is electrically interconnected at its other end with a bi-metal heater 38, which, in turn, is electrically interconnected at its other end with the load terminal 26. Consequently, when the circuit breaker separable main contacts 28 and 30 are closed upon each other, there is a complete electrical circuit through the circuit breaker 10 from right to left starting with load terminal 26 through bi-metal heater 38, through conductor 37, through movable contact arm 32, through movable contact 28 to fixed contact 30, and from there through the fixed contact support or U-shaped member 34 to line terminal 36.

Figure 5:
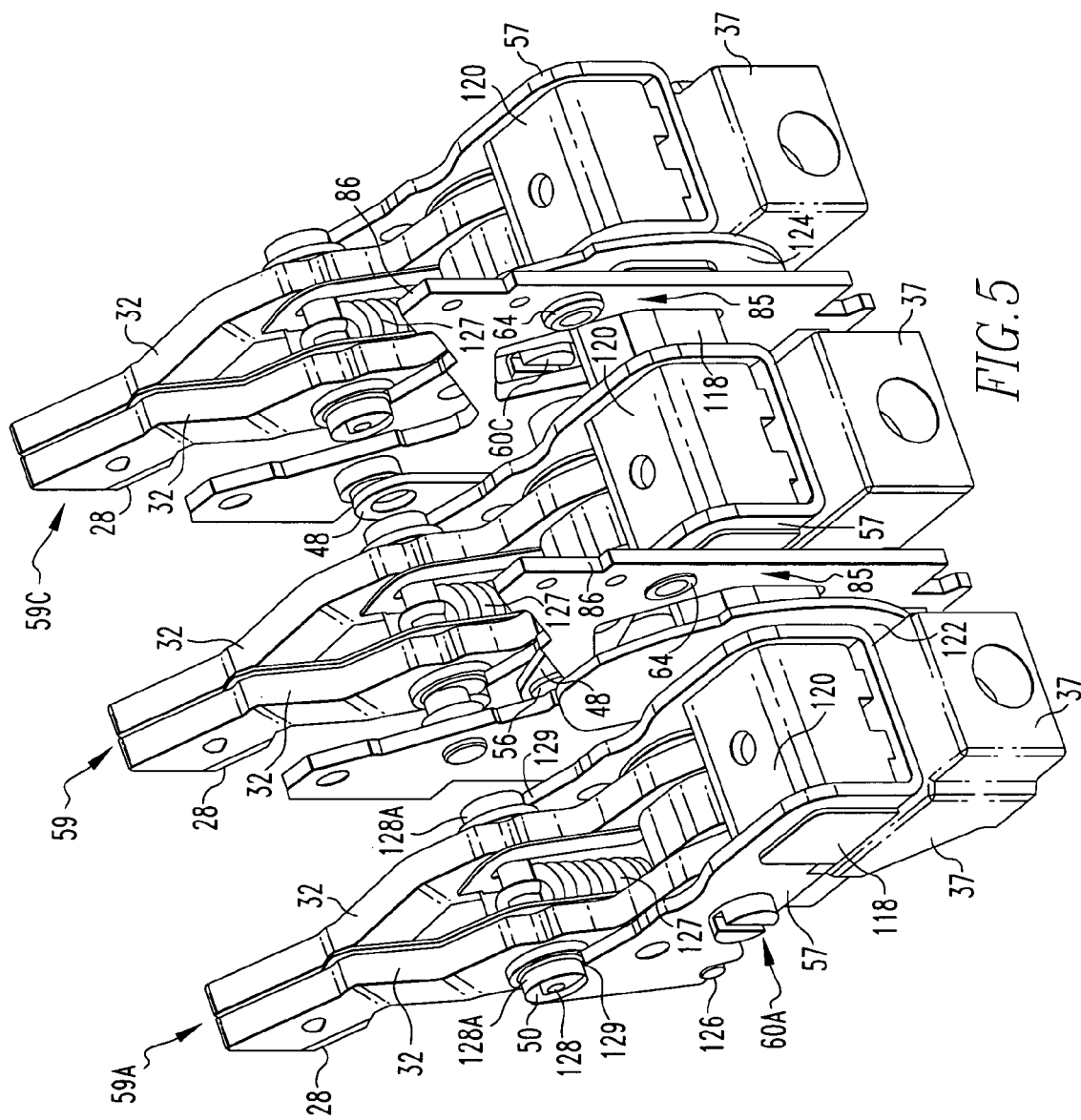
FIG. 5 is an isometric view of the cross bar and the movable contact arm of FIG. 3 along with movable contact arms of two adjacent poles.
Figure 9:
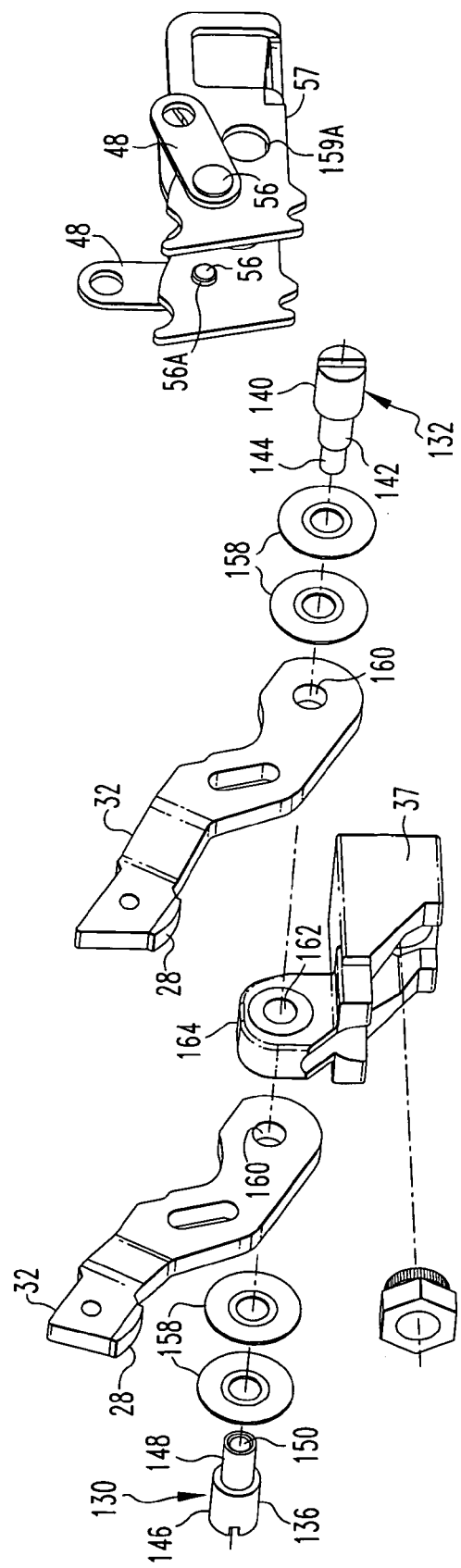
FIG. 9 is an exploded isometric view of the mechanism pole of FIG. 5.

The operating mechanism 22 assists in opening and closing the separable main contacts 28 and 30. The trip unit 24 cooperates with the operating mechanism 22 to trip open such contacts 28,30. In particular, the operating mechanism 22 includes a cradle 52, which is pivoted on one end at a cradle fixed pivot pin 54 by way of an opening 54A (FIG. 10) in the cradle 52 for placement of the cradle fixed pivot pin 54 therein. The cradle 52 may include a cradle-to-side accessory region side protrusion (not shown). There is provided an upper toggle link 46 (as best shown in FIG. 3) and a lower toggle link 48 (FIGS. 5 and 9). The links 46,48 are joined pivotally by an upper and lower toggle link pin 50. There is provided a lower toggle link to cam carrier attachment pin 56, which is affixed to the cam carrier 57 (FIG. 9) at an opening 56A (FIG. 9). There is also a cradle to upper toggle link pivot pin 58, by which the upper toggle link 46 is placed in physical contact with the cradle 52. There is further provided a movable contact arm main pivot assembly 59 (as best shown in FIG. 5), which movably, rotatably pivots on a pivot 60.

There is also provided a primary latch 62 which operates or pivots on a pivot 64. The primary latch 62 cooperates with a secondary latch 68, which pivots on a secondary latch pivot pin 70. The operating power for trip operation of the circuit breaker 10 is provided by a charged main toggle coil spring 72. The main toggle coil spring 72 is interconnected with a handle yoke 44 by way of a handle yoke attachment post 45A. The other end of the spring 72 is attached to the toggle link pin 50. The cradle 52 has a latch 73, which is captured or held in place at an opening 63 of the primary latch 62 when the separable main contacts 28 and 30 are closed. No tripping of the circuit breaker 10 can take place by way of the operating mechanism 22 until the primary latch 62 has been actuated away from the cradle latch 73 in a manner which will be described below.

There is provided a combination secondary latch-primary latch torsion spring 78 (FIG. 21) disposed on a spring pin 79. The torsion spring 78 exerts suitable force against both of the latches 62,68 to bias them in the on position of FIG. 3. Actuation of the primary latch 62 and the secondary latch 68 occurs, first, by way of the utilization of a resetable trip unit trip plunger 74, which is normally contained entirely within the removable trip unit 24. The trip unit trip plunger 74 is controlled or latched by way of a plunger latch or interference latch 75 of the trip unit 24. The secondary latch 68 is in disposition to be struck by the moving trip unit plunger abutment surface 80.

Although the primary and secondary latches 62,68 are disposed within a housing 11 formed by the base 12 and the covers 14,16, the trip unit plunger 74 is responsible for initiating all tripping action from the trip unit 24 into the region of the secondary latch 68. Alternatively, the secondary latch 68 may be actuated by a secondary cover rotary interlock 82 (FIG. 17), which will be described below. The secondary latch 68 is actuated to rotate clockwise with respect to FIG. 3, for example, in direction 81 about its pivot 70.

As the secondary latch 68 pivots, a stop surface 91 (FIG. 11) of the secondary latch 68 rotates away from the top 92 of the primary latch 62. At this point, the force of the main spring 72 (FIG. 3) overcomes the force of the torsion spring 78 (FIG. 21), thereby causing the primary latch 62 to rotate clockwise (with respect to FIG. 3) under the force of the cradle 72 and its latch 73. This causes the primary latch opening 63 to clear the cradle latch 73, in order to allow the cradle 52 to rotate counterclockwise (with respect to FIG. 3) about its pivot 54 under the power of the now collapsing main spring 72 by way of the force exerted thereupon by the upper toggle link 46 acting against the cradle to upper toggle link pivot pin 58 (FIG. 3). As the main spring 72 relaxes, the upper and lower toggle links 46,48 collapse, which, in turn, causes the movable contact arm main pivot assembly 59 to rotate clockwise (with respect to FIG. 3) about its pivot 60. This causes the contact arm 32 to rotate similarly in the same direction, thereby opening the separable main contacts 28,30 and, in most cases, establishing an electrical arc of conducting electrical current there across. Upon opening of the separable main contacts 28,30, the electrical arc is exposed to an arc chute 77.

The actuation of the secondary latch 68 to trip open the separable main contacts 28,30 can be duplicated by causing the secondary cover rotary interlock 82 (FIGS. 17–20) to rotate in the clockwise direction 81 (with respect to FIG. 3) by operation of the torsion spring 84 (FIG. 20), which will be described below.

Figure 16:
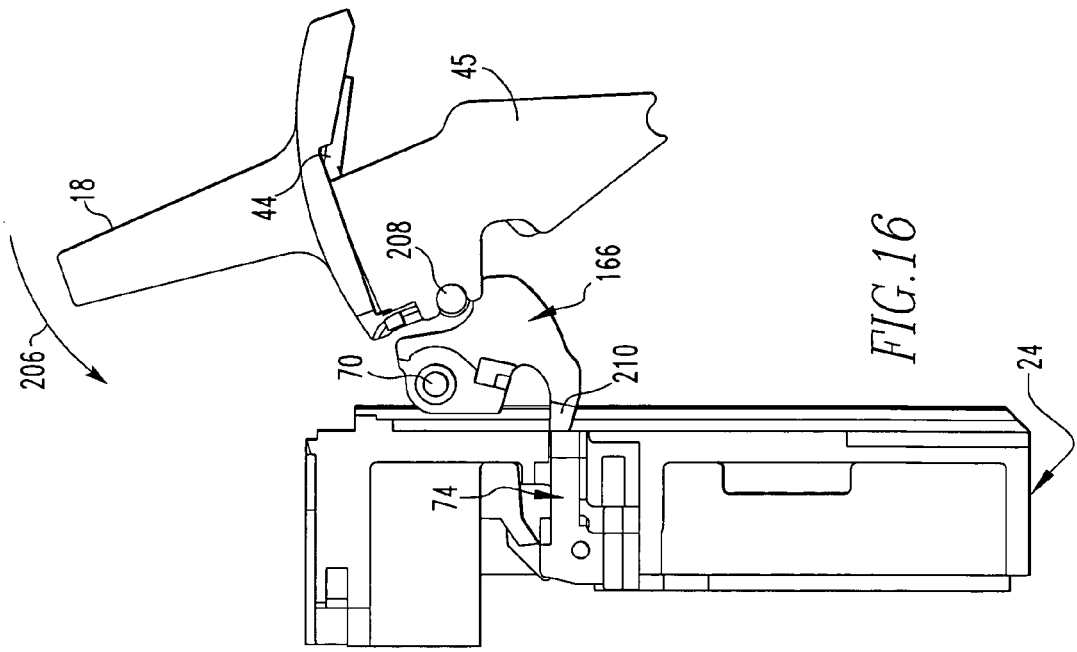
FIG. 16 is a simplified vertical elevation view showing the trip unit, trip unit plunger, reset lever and operating handle of FIG. 3 in the reset position.
Figure 15:
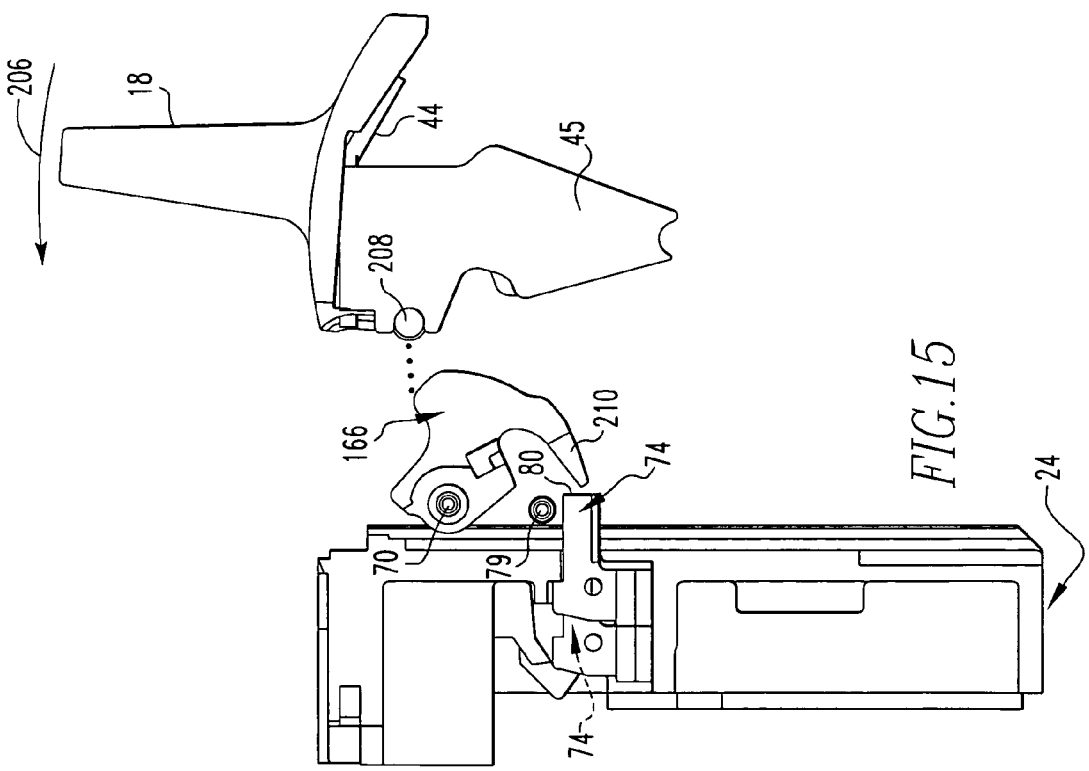
FIG. 15 is a simplified vertical elevation view showing the trip unit, trip unit plunger, reset lever and operating handle of FIG. 3 in the tripped position.

Resetting of the circuit breaker 10 from the tripped position is discussed below in connection with FIGS. 15 and 16.

Figure 4:
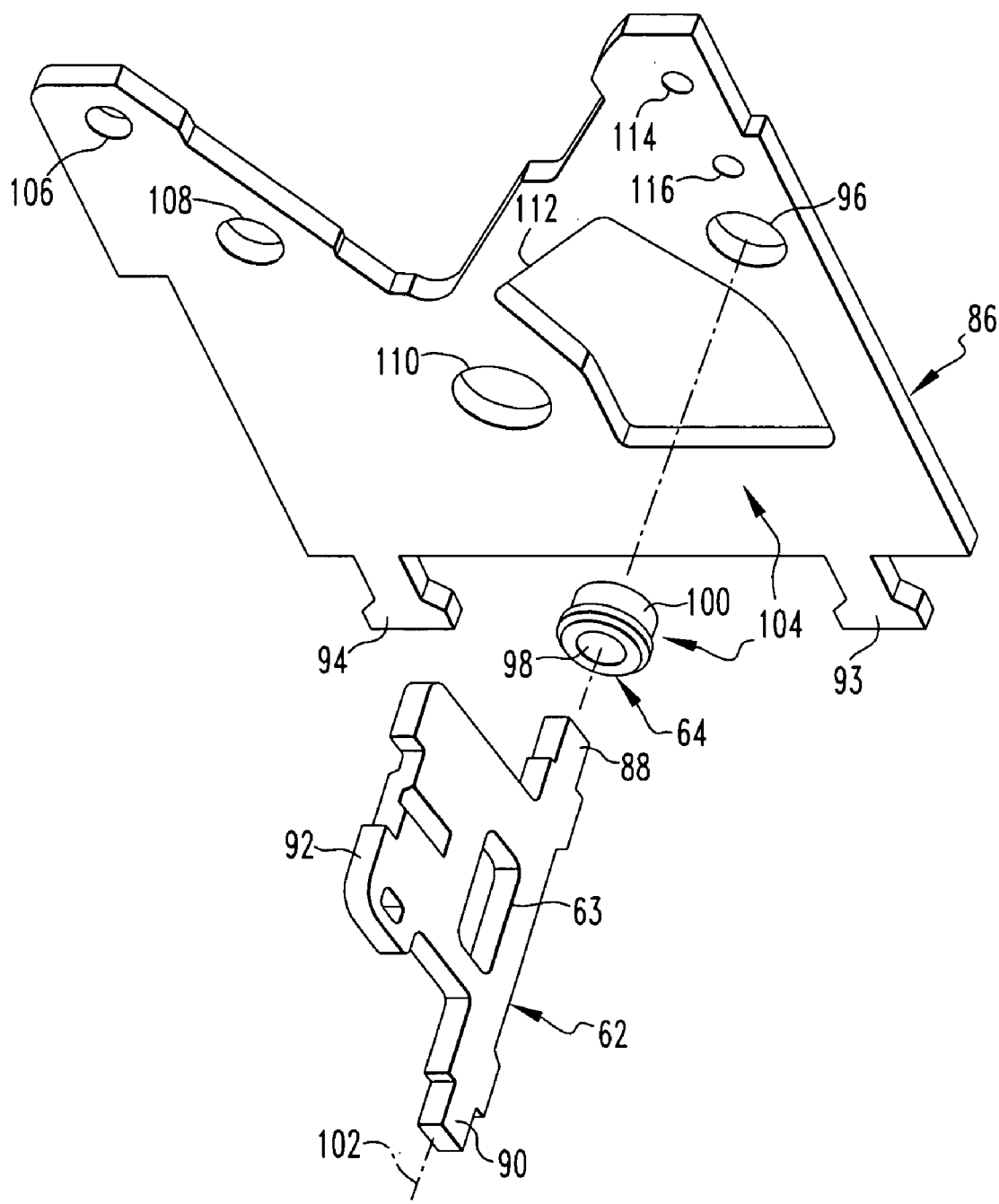
FIG. 4 is an exploded isometric view of the primary latch, hardened bushing and side plate of FIG. 3.

Referring to FIG. 4, the primary latch 62, the pivot 64 and a side plate 86 are shown. As shown in FIG. 5, two side plates 86 and two pivots 64 are employed to provide a support structure 85 for a circuit interrupter latch member, such as the primary latch 62, including a first leg or tab 88 and a second leg or tab 90. The side plates 86 include feet 93,94 that are supported by the housing base 12. As shown in FIG. 4, each of the side plates 86 (both are shown in FIG. 5) includes an opening 96. The pivot 64, such as a hardened bushing, includes an opening 98 and a perimeter 100. The opening 98 of the hardened bushing 64 pivotally mounts the first tab 88 of the primary latch 62. The perimeter 100 of the hardened bushing 64 is coupled to the side plate 86 at the opening 96 thereof. The hardened bushing 64 of the other side plate 86 (as shown in FIG. 5) is coupled to that side plate in a similar manner.

The hardened bushings 64 are preferably made of a first material (e.g., a suitable turned, hardened material, such as case hardened, lead alloy 1010 steel), and the side plates 86 are made of a second material (e.g., a suitable unhardened material, such as non-magnetic stainless steel), with the first material being suitably harder than the second material. The primary latch 62 is preferably a flat metal stamping made of the first material. The side plates 86 are preferably formed as a metal stamping.

The cross-section of the tabs 88,90 of the primary latch 62 has a square shape. The opening 98 of the hardened bushing pivot 64 is an inner circular bore within the circular perimeter 100. The bore of the opening 98 has a width and the width of the square shape, from one corner to its opposite corner, is slightly smaller than the width of the bore of the opening 98. The circular perimeter 100 of the hardened bushing pivot 64 is press fit into the circular side plate opening 96. It will be appreciated that the other tab 90 of the primary latch 62 interfaces in a like manner with the hardened bushing pivot 64 of the other side plate 86 (as shown in FIG. 5).

As shown in FIG. 4, the opening 63 of the primary latch 62 is adapted to receive the cradle latch 73 (FIG. 3). The primary latch 62 has a pivot axis 102 which is defined by the tabs 88,90 and which is offset from the primary latch opening 63.

A support member 104 for the primary latch 62 includes the side plate 86 and the bushing 64.

As shown with the one side plate 86 in FIG. 4, the two side plates 86 (FIG. 5) also include additional openings 106,108,110,112,114,116 as will be described. The opening 106 holds a pin 117 (FIG. 3) that serves as a stop for the upper links 46 (FIG. 3) when the operating handle 18 is moved to the on position (FIG. 3). The opening 108 holds the cradle fixed pivot pin 54 (FIG. 3) therein. The opening 110 allows a portion of the pivot 60 (FIG. 3) to pass therethrough as will be discussed below in connection with FIGS. 5–9. The opening 112 accommodates the arcuate movement of the cross bar 118 (FIGS. 3 and 5) from the closed position (FIG. 3) to the open or tripped open position (FIG. 5). The opening 114 holds the secondary latch pivot pin 70 (FIG. 3). The opening 116 holds the spring pin 79 (FIG. 3). The cross bar 118, the cradle 52, the primary latch 62 and the secondary latch 68 are located within the housing 11 (FIG. 3) between a first or upper (with respect to FIG. 3) surface defined by the covers 14,16 and a second or lower (with respect to FIG. 3) surface defined by the base 12.

Referring to FIG. 5, the cross bar 118 and the movable contact arm main pivot assembly 59 are shown for the center mechanism pole (i.e., center pole of the circuit breaker 10 of FIG. 1). Somewhat similar assemblies 59A,59C are included for the outer adjacent poles each of which includes the movable contact arms 32 and movable contact 28 of FIG. 3. The cross bar 118 is fixedly attached to the cam carriers 57 of the assemblies 59A,59,59C by staples 120. A first insulating phase barrier 122 separates the assemblies 59A,59 and a second insulating phase barrier 124 separates the assemblies 59,59C. The pivots 60A,60C for the respective assemblies 59A,59C are similar to the pivot 60 for the movable contact arm main pivot assembly 59, which pivot is discussed below in connection with FIGS. 6–8. Each of the cam carriers 57 pivots with respect to the corresponding one of the pivots 60A,60,60C. The pin 126 (shown with assembly 59A) is held in place by a contact arm spring 127 that is connected at its other end with a roller pin 128. The roller pin 128 sits between two rollers 128A that rest on the cam surfaces 129 of the cam carrier 57.

Figure 6:
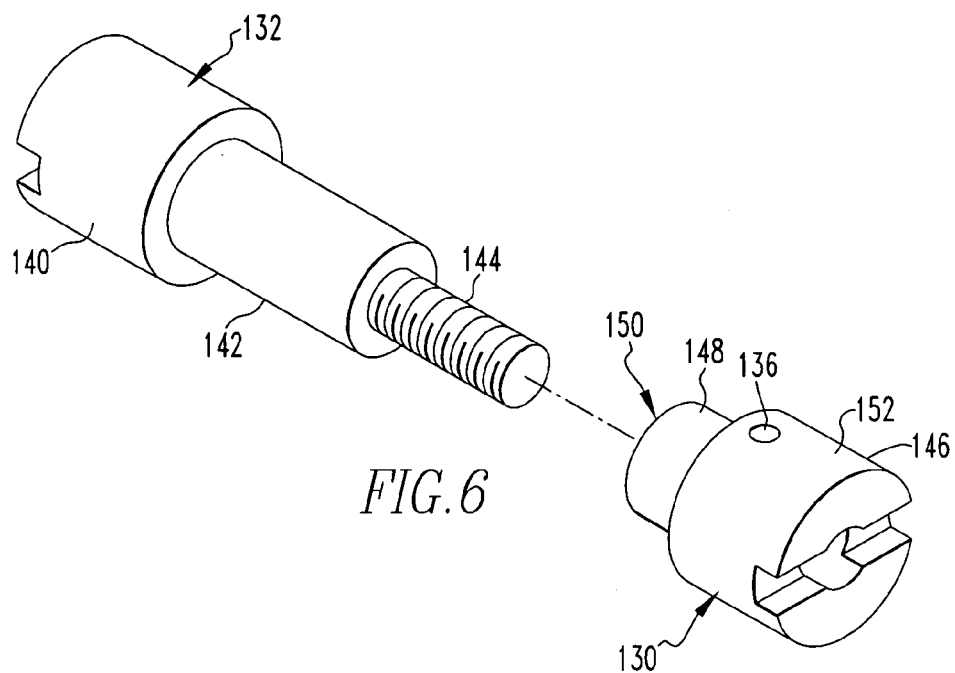
FIG. 6 is an exploded isometric view of the pivot of FIG. 3 formed by a lockable fastener including a clinch nut and a clinch bolt.
Figure 7:
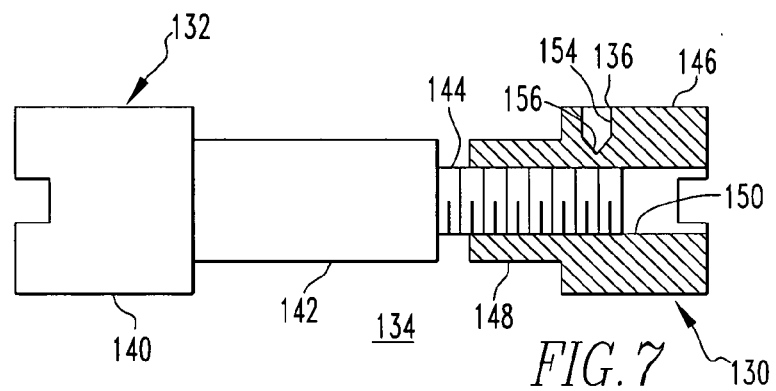
FIG. 7 is a vertical elevation view of the clinch bolt of FIG. 6 with the clinch nut shown in cross section prior to a compression step.
Figure 8:
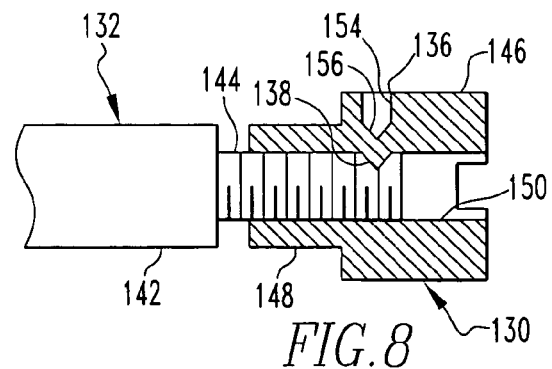
FIG. 8 is a vertical elevation view of the clinch bolt and clinch nut of FIG. 7 after the compression step.

FIG. 6 shows two components of the pivot 60 (FIG. 3), which includes a first member, such as a clinch nut 130, and a second member, such as a clinch bolt 132. As shown in FIG. 7, the clinch nut 130 is assembled onto the clinch bolt 132 to form a lockable fastener 134, which is adjusted to the proper setting prior to a compression step as shown in FIG. 8. As shown in FIG. 8, the bottom of a hole 136 of the clinch nut 130 is wedged or compressed into a threaded part 138 of the clinch bolt 132, thereby locking the clinch nut 130 and preventing the same from turning. As will be discussed below in connection with FIG. 9, the lockable fastener 134, after being compressed as shown in FIG. 8, may be employed to connect together a plurality of components of, for example, the circuit breaker 10, in order to maintain electrical conductivity between such components while permitting relative movement therebetween.

The clinch bolt 132 includes a second head 140, an elongated second axle portion 142 and an elongated threaded shank portion 144. The clinch nut 130 includes a first head 146 and a first axle portion 148. A central threaded cavity, such as bore 150, is formed within the first axle portion 148 and within a portion of the first head 146. The elongated threaded shank portion 144 is externally threaded with a plurality of threads to threadably cooperate with the central threaded bore 150 of the clinch nut 130. A side 152 of the first head 146 has the opening 136 therein. A passageway 154 is between the side 152 at the opening 136 and a surface 156 proximate the threaded cavity 150. The passageway 154 is normal to the threaded cavity 150.

As shown in FIG. 7, at least a portion of the threaded shank 144 is threadably receivable in the threaded cavity 150, in order to axially align the clinch nut 130 and clinch bolt 132, which are adapted to be locked by deformation (as shown in FIG. 8) of the surface 156 of the clinch nut 130 to prevent loosening of the members 130,132. That surface 156 is adapted to be deformed (e.g., by compression; by being wedged) to engage at least one of the threads of the threaded shank 144.

As shown in FIG. 9, the clinch bolt 132 and the clinch nut 130 of the lockable fastener 134 of FIG. 7 also include a number of spring washers 158. In use, the first and second axle portions 148 and 142 and the first and second heads 146 and 140 pass through openings 159B and 159A, respectively, of the cam carrier 57. Then, the spring washers 158 are disposed on the first and second axle portions 148 and 142 adjacent the first and second heads 146 and 140 respectively. The first axle portion 148 is received through the pivot hole 160 of one of the movable arms 32, and the second axle portion 142 is received through the pivot hole 160 of the other movable arm 32. The first and second axle portions 148 and 142 are then received in a bore 162 of the post 164 to fasten the movable arms 32 to the load terminal-contact arm conductor 37.

The movable arms 32 are pivotally mounted to the post 164 with the lockable fastener 134 (FIG. 7). As will be discussed in greater detail, below, the lockable fastener 134 fastens the movable arms 32 to the post 164 with sufficient force to provide electrically conductive connection between the post 164 and the movable arms 32 while permitting pivoting movement of such movable arms with respect to the post 164. Each movable arm 32 includes the hole 160 (FIG. 9) formed therein near one end, and the movable contact 28 electrically conductively disposed thereon opposite the hole 160. The movable arm 32 is electrically conductively connected with the corresponding one of the load terminals 26 (FIG. 3) through the lockable fastener 134 (FIG. 7) and the conductor 37.

The threaded shank portion 144 is received in the threaded cavity 150 of the clinch nut 130 and is threadably engaged therewith. The members 132 and 130 are then threadably tightened with respect to one another until a certain suitable level of torque is reached. Such a torque likely will have been selected as providing an optimum or appropriate compromise between the desire to electrically conductively fasten the movable arms 32 to the post 164 of the load terminal-contact arm conductor 37, while limiting the rotational friction therebetween. At such torque, the first and second axle portions 148 and 142 will be spaced slightly apart, as is indicated in FIG. 8, in order that a suitable compressive loading can be achieved therebetween without interference between the ends of those axle portions.

In tightening the members 132 and 130 to the aforementioned desired level of torque, the first and second heads 146 and 140 compress the spring washers 158, whereby a given compressive force is maintained between those first and second heads. It is known that such spring washers 158 deflect only a relatively small amount in being compressively loaded. Since the various components of the circuit breaker 10 (FIG. 3) tend to heat up during operation thereof, and since such heating results in a certain amount of thermal expansion of the aforementioned components, the spring washers 158 help to maintain the level compressive loading between the first and second heads 146 and 140 despite temperature fluctuations.

After the first and second members 132 and 130 are tightened to the desired level of torque, the deformation of the surface 156 (FIGS. 7 and 8) advantageously assists in resisting the clinch nut 130 from becoming unthreaded, i.e., loosened, from the clinch bolt 132, which helps to retain the lockable fastener 134 (FIG. 7 as locked in FIG. 8) at the desired initially tightened level of torque despite repeated operation of the movable arms 32 of the circuit breaker 10.

The lockable fastener 134 and the circuit breaker 10 are configured to provide relatively extended periods of reliability since the lockable fastener 134 can be locked at a given torque setting that is substantially unaffected by operation of the circuit breaker 10. These results advantageously resist loosening of the first and second members 132 and 130 with respect to one another.

As shown in FIG. 9, the clinch bolt 132 passes through and pivotally engages the opening 159A of one side of the cam carrier 57 and the clinch nut 130 passes through and pivotally engages the opening 159B of the other side of such cam carrier. As applied to the assembly 59 of FIG. 5, the clinch bolt 132 passes through and pivotally engages the opening 110 (FIG. 4) of one of the side plates 86 and the clinch nut 130 passes through and pivotally engages the opening 110 of the other side plate 86. The pivots 60A,60C of FIG. 5 are similar to the pivot 60, except that the heads 140,146 are relatively shorter in length since the side plates 86 are not employed.

A wide range of other suitable pivots and lockable fasteners may be employed, such as, for example, a lockable fastener comprising a clinch nut having a threaded cavity formed therein; a clinch bolt including a threaded shank having a seat disposed thereon, with at least a portion of the threaded shank being threadably receivable in the threaded cavity; and a locking member being engageable with the seat to lockably engage the shank with the clinch nut, as is disclosed in U.S. patent application Ser. No. 10/742,594, filed Dec. 19, 2003.

Figure 10:
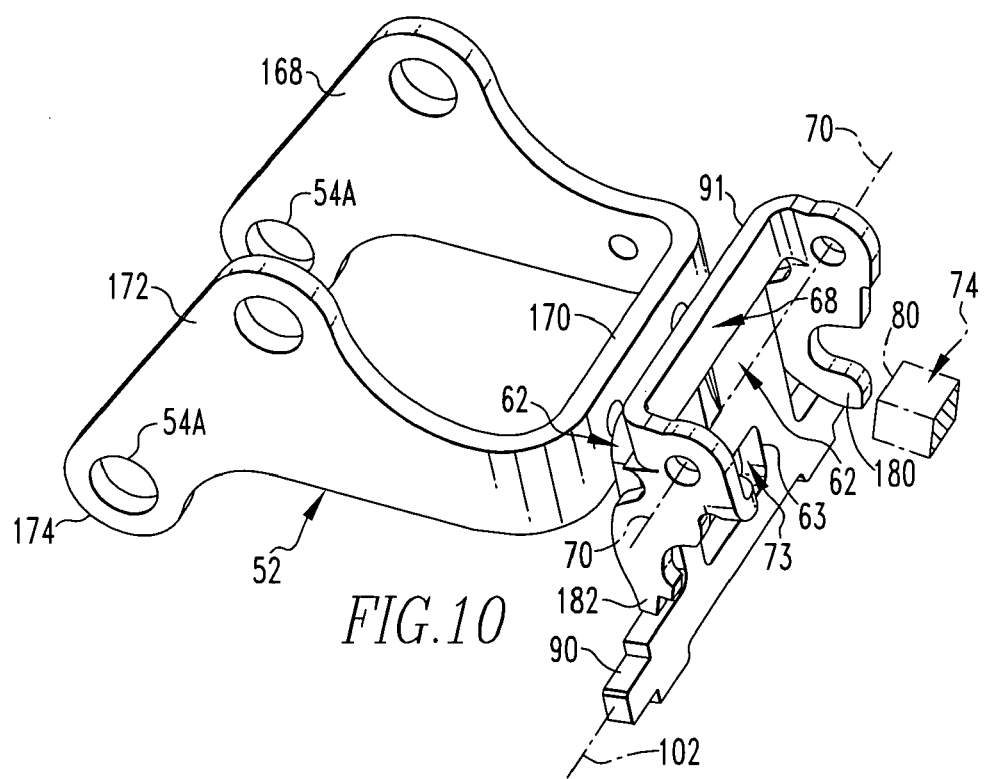
FIGS. 10 and 11 are simplified isometric views showing the cradle, primary latch, secondary latch and trip unit plunger of FIG. 3 in the closed position, which is the same as the open position.
Figure 11:
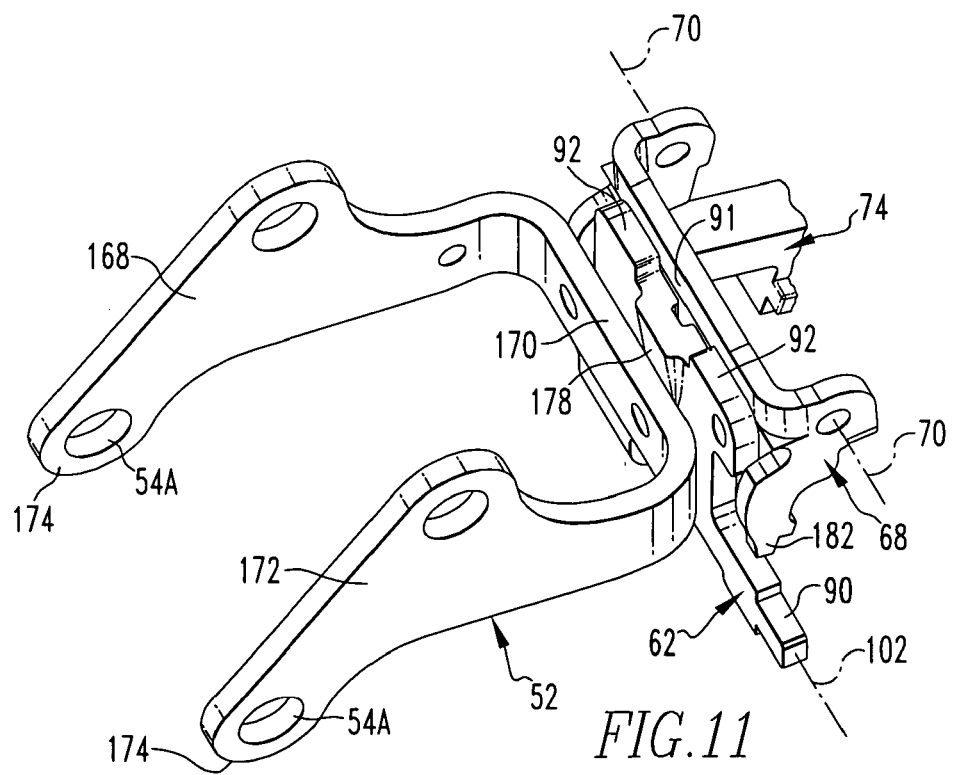
Figure 12:
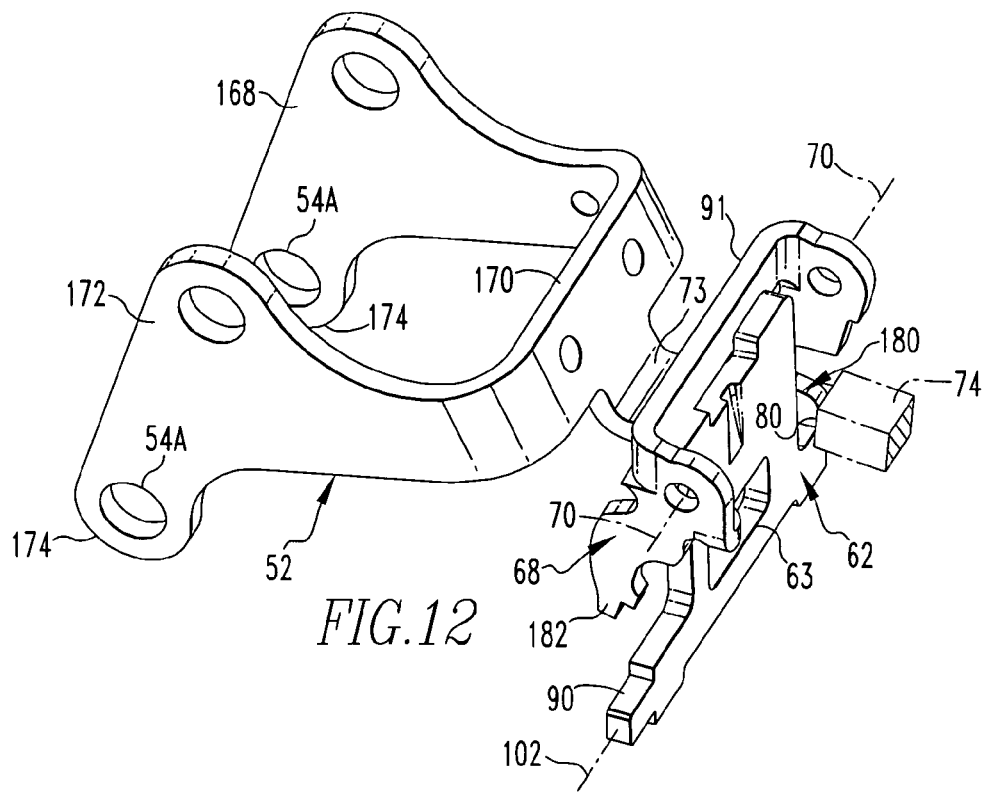
FIGS. 12 and 13 are simplified isometric views showing the cradle, primary latch, secondary latch and trip unit plunger of FIG. 3 in the tripped position.
Figure 13:
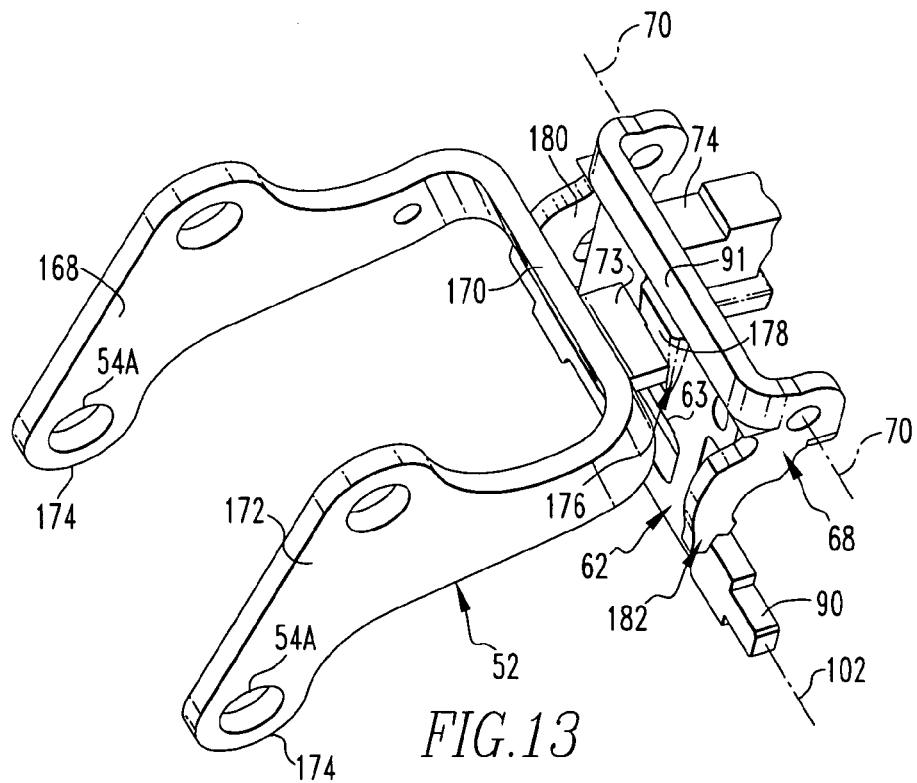
Figure 14:
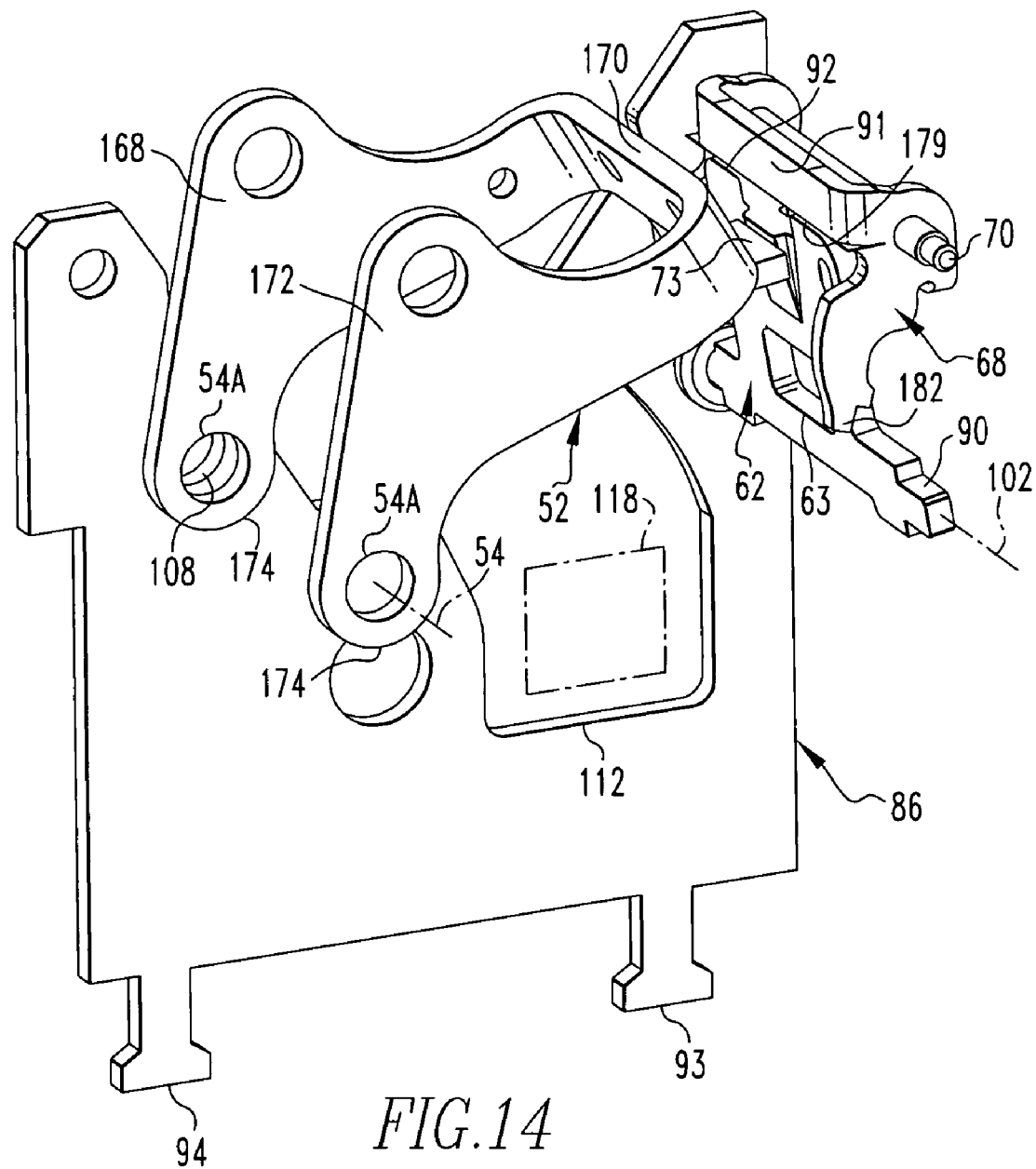
FIG. 14 is a simplified isometric view showing the cradle, primary latch and the secondary latch with respect to the side plate of FIG. 3 in the tripped position.

FIGS. 10 and 11 show the cradle 52, the primary latch 62, the secondary latch 68 and the trip unit plunger 74 in the closed position of the circuit breaker 10 (FIG. 3), which is the same as the open position. FIGS. 12 and 13 show the cradle 52, the primary latch 62, the secondary latch 68 and the trip unit plunger 74 in the tripped position. FIG. 14 similarly shows the cradle 52, the primary latch 62 and the secondary latch 68 with respect to the side plate 86 in the tripped position. FIG. 15 shows the trip unit 24, the trip unit plunger 74 in the tripped position (the non-tripped position being shown in phantom line drawing), a reset lever 166 and the operating handle 18 of FIG. 3 in the tripped position. FIG. 16 shows the trip unit 24, the trip unit plunger 74, the reset lever 166 and the operating handle 18 in the reset position.

As was discussed above in connection with FIGS. 3 and 5, the cross bar 118 is supported by the staples 120 and the cam carriers 57. The cross bar 118 is adapted to move in an arcuate path between a first position wherein the separable contacts 23 (FIG. 3) are open or tripped open (as shown by the position of the movable contacts 28 of FIG. 5), and a second position wherein such separable contacts 23 are closed (FIG. 3). In and between those two positions, the cross bar 118 passes within the opening 112 of the side plates 86 (as shown in FIGS. 4 and 14).

The cradle 52 is pivotally mounted within the housing 11 of FIG. 3 between the two side plates 86 (FIG. 5) by the pin 54 that passes through the cradle openings 54A and that is held by the side plates 86 at the openings 108 (only one opening 108 and one side plate 86 are shown in FIG. 14). As shown in FIGS. 10–14, the cradle 52 has a general U-shape including a first leg 168, a second leg 172 and a base 170 carrying the cradle latch 73 (FIGS. 13 and 14). Each of the first and second legs 168,172 have an end 174 with the opening 54A through which, with the pin 54 (FIGS. 3 and 14), the end 174 of the legs 168,172 is pivotally mounted to the corresponding side plate 86. The cradle 52, as shown, is preferably formed from a single piece of material. For example, the primary latch 62 and the cradle 52 are preferably made of case hardened, lead alloy 1010 steel. The secondary latch 68 is preferably made of 1010 steel.

As was discussed above in connection with FIGS. 4 and 5, the primary latch 62 is pivotally mounted within the housing 11 at the hardened bushings 64 of the side plates 86. The primary latch 62 includes the pivot 102, the opening 63 and a free end at the top 92 of such primary latch as shown in FIGS. 4 and 11. As shown in the position of FIGS. 10 and 11, the cradle latch 73 (FIG. 10) is adapted to rest within the primary latch opening 63 when the separable contacts 23 (FIG. 3) are not tripped open. The surface 91 (FIG. 11) of the secondary latch 68 engages the free end of the primary latch 62 when the separable contacts 23 (FIG. 3) are not tripped open, in order to maintain the cradle latch 73 within the primary latch opening 63.

As best shown in FIG. 13, the primary latch 62 includes a ramp portion 176 having a surface 178 between the opening 63 and the top 92 (FIG. 11) of the primary latch 62. The cradle latch 73 slides upon the surface 178 as the cradle 52 pivots counterclockwise (with respect to FIGS. 11 and 13) from the latched (closed or open position of FIGS. 10 and 11) to the tripped open position (FIGS. 12–14). In this tripped open position, a surface 179 (FIG. 14) of the secondary latch 68 rests on the top 92 (FIG. 11) of the primary latch 62.

Figure 21:
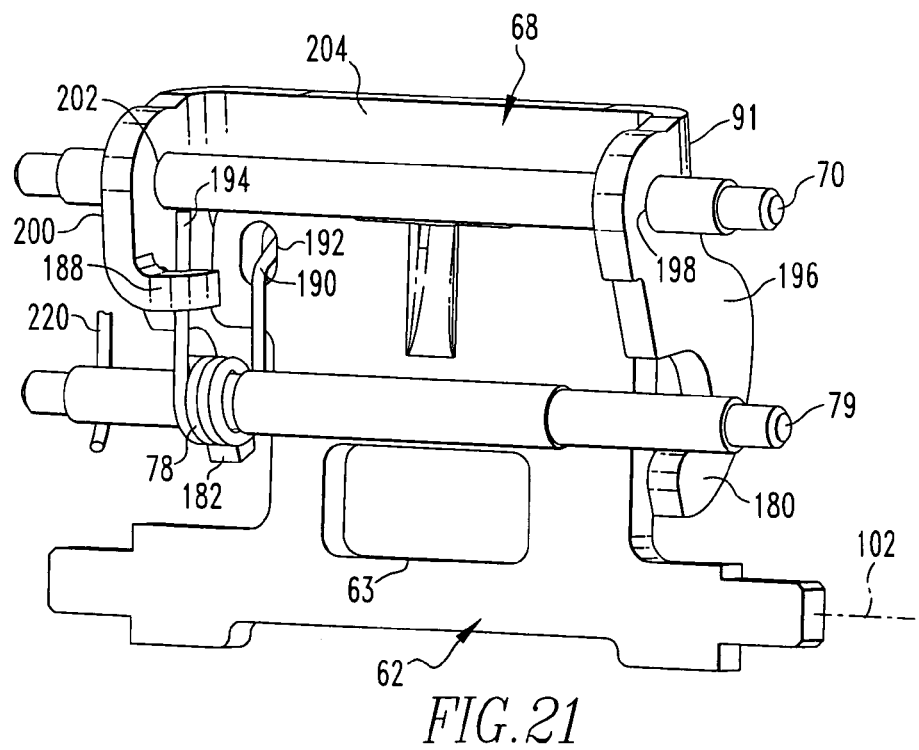
FIG. 21 is an isometric view showing the primary latch, the secondary latch and the spring pin of FIG. 3 along with a latch torsion spring.

The secondary latch 68 includes a first leg 180 (as best shown in FIG. 21) disposed between the pivot pin 70 for the secondary latch 68 and the pivot 102 for the primary latch 62. The trip unit plunger 74, and more specifically the plunger abutment surface 80 (FIG. 3), is adapted to engage the secondary latch leg 180, in order to rotate the secondary latch 68 clockwise (with respect to FIGS. 10 and 11) about the pivot pin 70 and trip open the separable contacts 23 (FIG. 3). That tripping occurs after the surface 91 of the secondary latch 68 releases the free end of the primary latch 62. Both of the secondary and primary latches 68,62 rotate clockwise (with respect to FIGS. 10 and 11) to release the cradle latch 73. The secondary latch 68 reduces the requisite force needed by the trip unit plunger 74 to trip open the separable contacts 23. Otherwise, without the secondary latch 68, a relatively greater force would be needed for the trip unit plunger 74 to pivot the primary latch 62, which combination is not employed.

Figure 17:
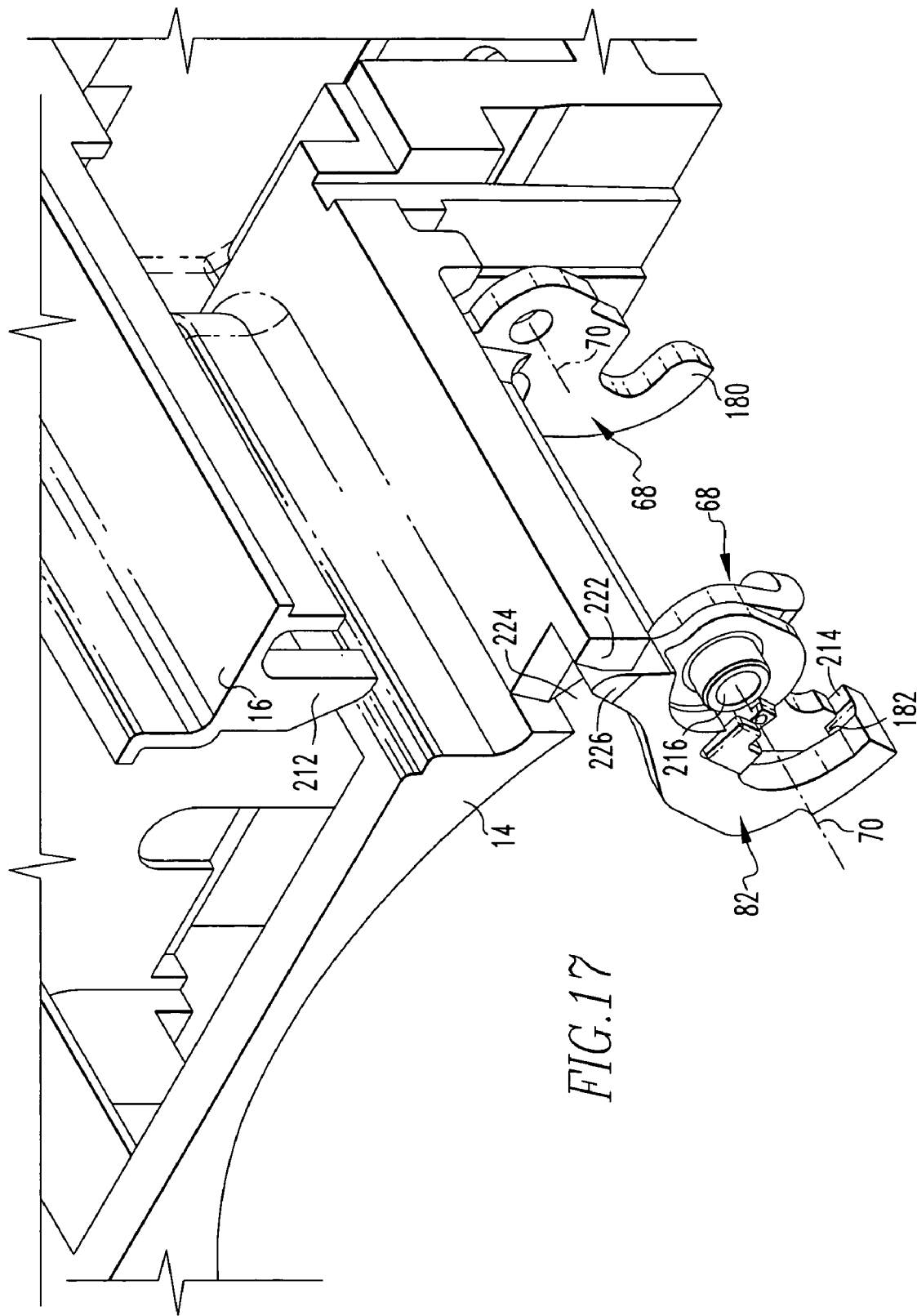
FIG. 17 is an isometric view showing the secondary cover of FIG. 1 being removed to release the secondary cover rotary interlock with the secondary latch in the tripped position.

The secondary latch 68 includes a second leg 182 that is engaged by the spring-biased secondary cover rotary interlock 82 (FIG. 17), which also rotates clockwise (with respect to FIG. 17) to rotate the secondary latch 68 clockwise with respect to FIGS. 10, 11 and 17).

The trip unit 24 cooperates with the operating mechanism 22 to trip open the separable contacts 23 (FIG. 3). The housing 11 includes an internal wall 186, and the trip unit 24, the pivot pin 70 and the first leg 180 of the secondary latch 68 are proximate that wall.

As best shown in FIG. 14, the secondary latch 68 is pivotally mounted within the housing 11 (FIG. 3) by a pivot defined by the pivot pin 70 that engages the side plates 86 (FIGS. 4 and 5) at the opening 114 (FIG. 4). As shown in FIGS. 3 and 14, the primary latch 62 and the secondary latch 68 are between the covers 14,16 of the housing 11 (FIG. 3) and the cross bar 118 (shown in phantom line drawing in FIG. 14) in the open or tripped open position of the cross bar 118. The cross bar 118 is offset from the primary latch 62 and the secondary latch 68 in the closed position of the cross bar 118 (FIG. 3). The surface 91 and the pivot pin 70 for the secondary latch 68 are between the covers 14,16 of the housing 11 (FIG. 3) and the pivot 102 of the primary latch 62.

As shown in FIG. 21, the secondary latch 68 includes an ear 188 disposed between the pivot pin 70 for the secondary latch and the pivot 102 for the primary latch 62. The spring pin 79 is disposed between the side plates 86 (FIG. 5) and is between the pivot pin 70 and the primary latch pivot 102. The torsion spring 78 is carried by the spring pin 79 and includes a first leg 190 engaging the primary latch 62 at an opening 192 proximate the free end thereof, and a second leg 194 engaging the secondary latch ear 188. The secondary latch 68 has a general U-shape with a first side 196 having a first opening 198 and carrying the first leg 180, a second side 200 having a second opening 202 and carrying the second leg 182, and a third side 204 carrying the surface 91 (FIG. 11). The first and second openings 198,202 carry the secondary latch pivot pin 70.

The operating mechanism main spring 72 (FIG. 3) biases the cradle 52 through the upper link 46 to pivot in a counter-clockwise (with respect to FIG. 3) rotational direction. The torsion spring 78 (FIG. 21) biases the primary latch 62 and the secondary latch 68 to pivot in the same rotational direction (with respect to FIG. 3). The main spring 72 causes the cradle latch 73 (FIGS. 12–14) to pivot the primary latch 62 in an opposite clockwise (with respect to FIGS. 12–14) rotational direction when the secondary latch surface 91 releases the free end of the primary latch 62, thereby reversing a direction of force on the primary latch 62 relative to the pivot 102 thereof.

Figure 18:
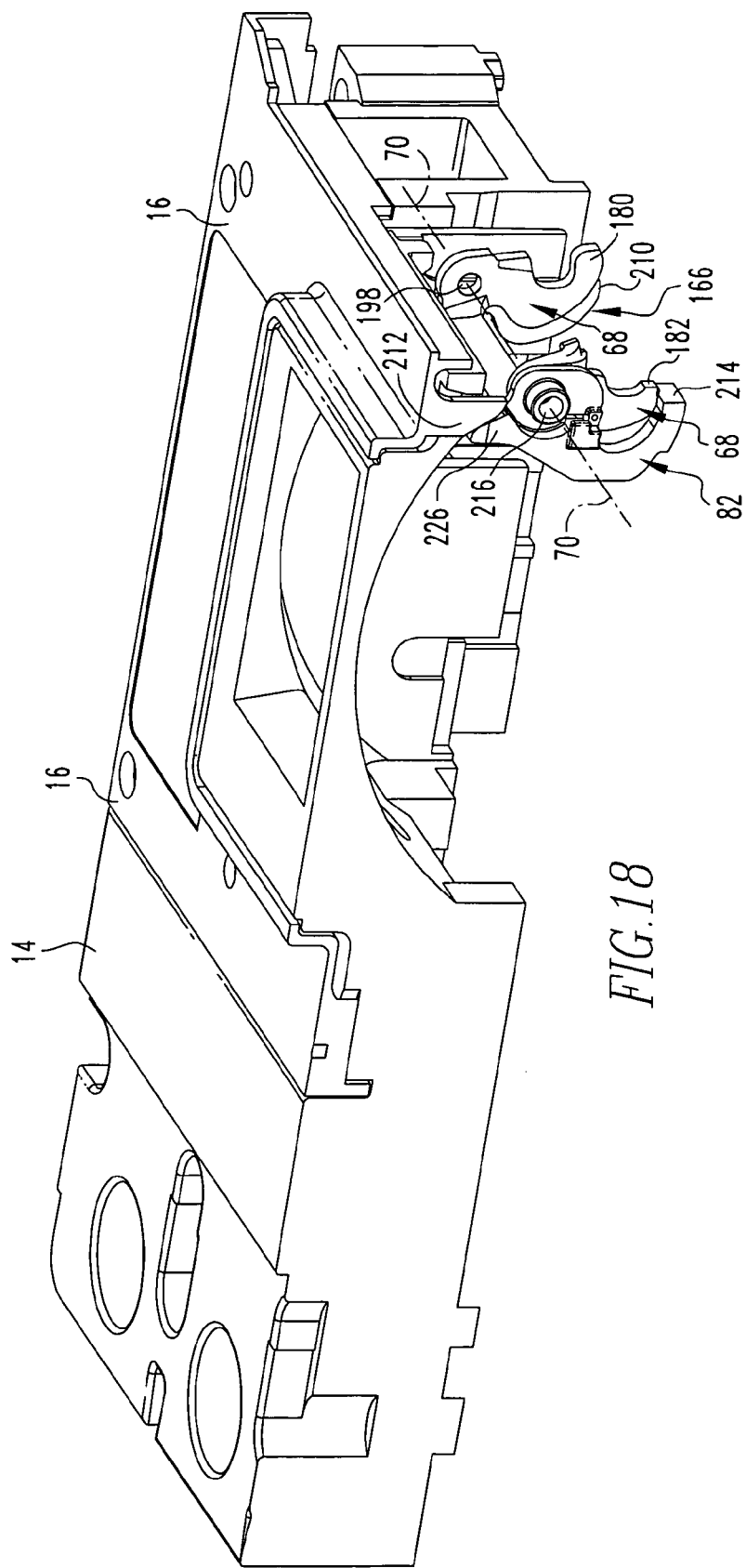
FIG. 18 is a simplified cut away isometric view showing a portion of the secondary cover of FIG. 1 engaging the secondary cover rotary interlock of FIG. 17.

After the trip unit 24 trips the circuit breaker 10 (FIG. 3), the operating handle 18 is manually pivoted counter-clockwise (with respect to FIGS. 15 and 16) in the direction shown by arrow 206, in order to reset the cradle 52 (FIG. 3) and the trip unit plunger 74 to the latched or non-tripped position. The handle 18 is fixedly coupled to the handle extension 45 by the handle yoke 44. The handle extension 45 carries a reset pin 208 that engages the cradle 52 (FIG. 3) and the reset lever 166. This rotates the cradle 52 clockwise (with respect to FIGS. 3 and 14) until the cradle latch 73 is recaptured within the primary latch opening 63 (FIG. 10). This reset pin 208 also rotates the reset lever 166 clockwise (with respect to FIGS. 15 and 16) until a leg 210 thereof engages the surface 80 of the trip unit plunger 74, thereby causing it to move to the left (with respect to FIGS. 15 and 16) until it is re-latched by the plunger latch 75 (FIG. 3) of the trip unit 24. As shown in FIGS. 15 and 18, the reset lever 166 is pivotally mounted on the secondary latch pivot pin 70. A torsion spring (not shown) is carried by the pivot pin 70 and includes a first leg (not shown) engaging the spring pin 79 (FIG. 15) and a second leg (not shown) engaging the reset lever 166, in order to bias the same counter-clockwise (with respect to FIG. 15).

Figure 19:
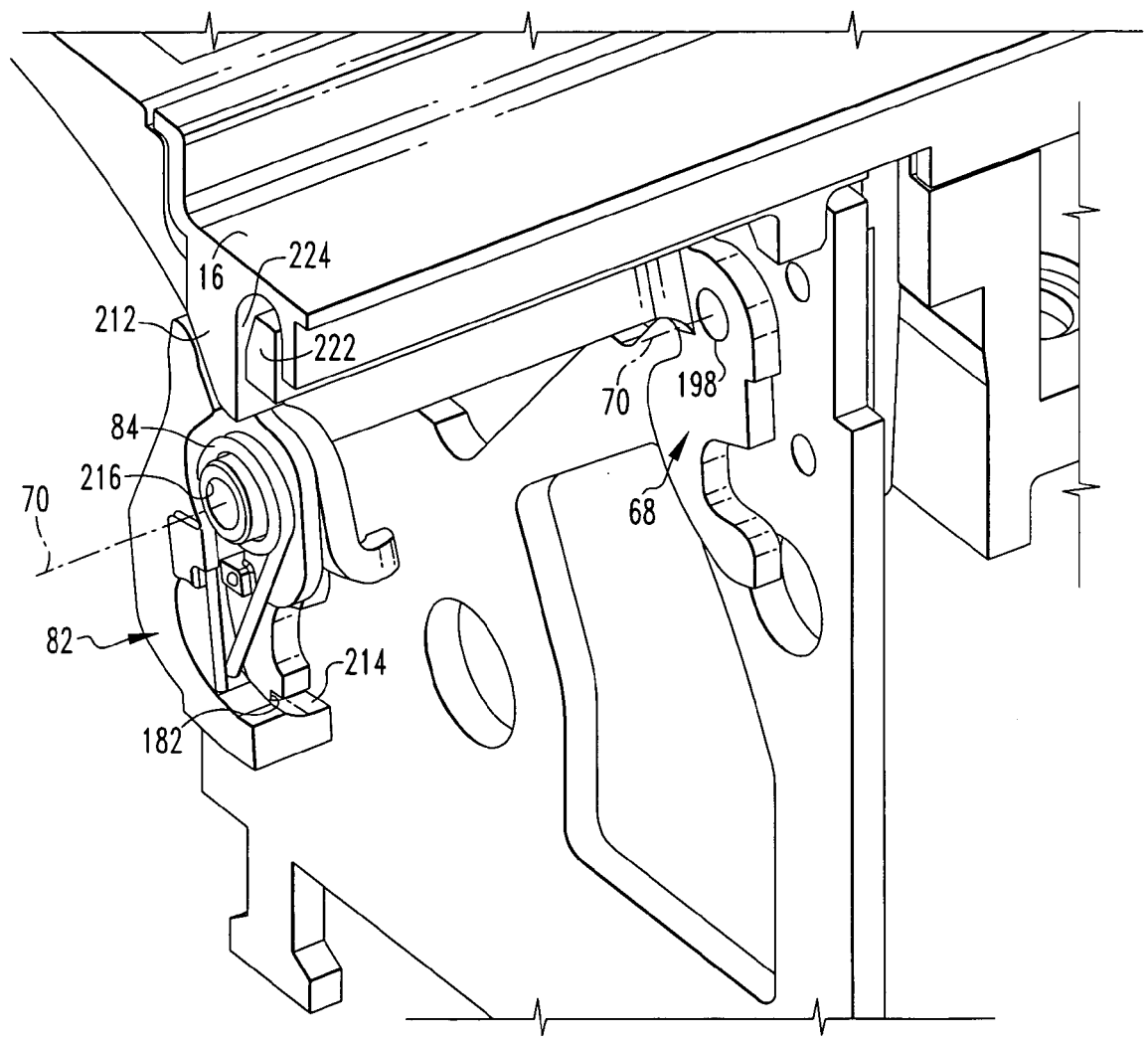
FIG. 19 is an isometric view showing the secondary cover of FIG. 1 engaging the secondary cover rotary interlock of FIG. 18 with the secondary latch in the latched position.
Figure 20:
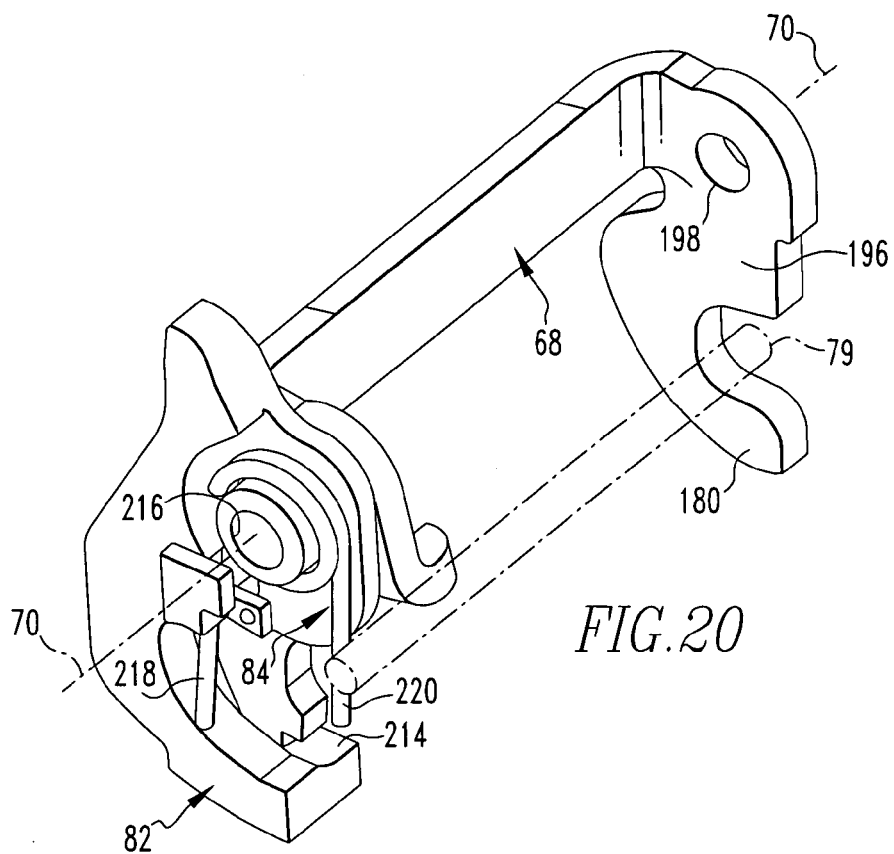
FIG. 20 is an isometric view showing the secondary cover rotary interlock and the secondary latch of FIG. 17.

Referring to FIGS. 17–19, the secondary cover 16 and the secondary cover rotary interlock 82 are shown along with the secondary latch 68 of FIG. 3. The rotary interlock 82 (e.g., a molded member) and spring 84 provide the housing 11 of FIG. 2 with a spring-biased member that is adapted to engage the second leg 182 of the secondary latch 68, in order to trip open the separable contacts 23 (FIG. 3) when the secondary cover 16 is removed (as shown in FIG. 17). Normally, the secondary cover 16, and more particularly a tab 212 thereof, engages the secondary cover rotary interlock 82 as shown in FIGS. 18 and 19. When the secondary cover 16 is installed on the primary cover 14, the secondary cover tab 212 pushes on the rotary interlock 82, thereby rotating the same counter-clockwise (with respect to FIGS. 17 and 18) and away from the second leg 182 of the secondary latch 68. This position maintains the secondary latch 68 in the latched position (FIGS. 10, 11, 18 and 19). When the secondary cover 16 is removed (FIG. 17), the rotary interlock 82 is rotated clockwise (with respect to FIG. 17) by the spring 84 (FIG. 20). A leg 214 of the rotary interlock 82 engages the leg 182 of the secondary latch 68 and rotates the same clockwise (with respect to FIG. 17), thereby tripping the circuit breaker 11 in a similar manner as was discussed above in connection with FIGS. 12–14.

The rotary interlock 82 is pivotally mounted within the housing 11 and cooperates with the secondary latch 68 and the secondary cover tab 212 to release the cradle latch 73 through the primary latch 62 and to trip open the separable contacts 23 when the secondary cover 16 is removed from the primary cover 14. The rotary interlock 82 includes an opening 216, which like the secondary latch openings 198, 202 (FIG. 21), receive the pivot pin 70.

As shown in FIG. 20, the pivotally mounted rotary interlock 82 is biased by the torsion spring 84 carried by the pivot pin 70. The torsion spring 84 includes a first leg 218 engaging the rotary interlock 82 and a second leg 220 engaging the spring pin 79. When the secondary cover 16 is on the primary cover 14 (FIGS. 18 and 19), the rotary interlock 82 rotates counter-clockwise (with respect to FIGS. 17–19) to maintain the latched position of the latches 62,68 (FIGS. 10 and 11). In the latched position of FIGS. 18 and 19, the leg 214 of the rotary interlock 82 may be slightly offset from the leg 182 of the secondary latch 68. In the tripped position of FIG. 17, the leg 214 of the rotary interlock 82 engages the leg 182 of the secondary latch 68. When the secondary cover 16 is removed from the primary cover 14 (FIG. 17), the rotary interlock 82 rotates clockwise (with respect to FIG. 17) under the bias of the spring 84 (FIG. 20) to move the legs 214,182 and, thus, the secondary latch 68 clockwise (with respect to FIG. 17) to the unlatched position of FIGS. 12–14).

As shown in FIG. 17, the primary cover 14 includes a stop 222 and an opening 224. The rotary interlock 82 includes a second leg 226. As shown in FIG. 18, the secondary cover tab 212 rests in the primary cover opening 224 (FIG. 17) and engages the rotary interlock second leg 226 to prevent the rotary interlock first leg 214 from engaging the secondary latch leg 182 and rotating that secondary latch 68 to the unlatched or tripped position thereof.

The disclosed lockable fastener 134 makes it easier for a clinch machine to secure the clinch nut 130. This lockable fastener 134 also reduces the need for an additional locking set screw. The parts are secured by deformation of the material of the clinch nut 130 to prevent loosening of the clinch bolt 132 and the clinch nut 130.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit breaker comprising:
 a line conductor;

a load conductor;

a fixed contact being electrically conductively disposed on one of said line and load conductors;

a movable contact;

an operating mechanism comprising a movable arm, said movable contact being electrically conductively disposed on said movable arm;

a lockable fastener, comprising:

a first member including a treaded cavity formed therein, a side having opening therein, and a passageway between said side at said opening and a surface proximate said threaded cavity;

a second member including a threaded shank, at least a portion of the threaded shank being threadably received in the threaded cavity of said first member, in order to axially align said first member and said second member;

wherein said first member and said second member are locked by deformation of the surface of said first member to prevent loosening of said first and second members;

wherein said movable arm is electrically conductively connected with and movably mounted to the other of said line and load conductors with said lockable fastener; and wherein said operating mechanism further comprises a cam carrier including a first side having an opening and a second side having an opening; wherein said first member passes through the opening of said first side; and wherein said second member passes through the opening of said second side.

2. A circuit breaker comprising:

a line conductor;

a load conductor;

a fixed contact being electrically conductively disposed on one of said line and load conductors;

a movable contact;

an operating mechanism comprising a movable arm, said movable contact being electrically conductively disposed on said movable arm;

a lockable fastener, comprising:

a first member including a threaded cavity formed therein, a side having opening therein, and a passageway between said side at said opening and a surface proximate said threaded cavity;

a second member including a threaded shank, at least a portion of the threaded shank being threadably received in the threaded cavity of said first member, in order to axially align said first member and said second member;

wherein said first member and said second member are locked by deformation of the surface of said first member to prevent loosening of said first and second members;

wherein said movable arm is electrically conductively connected with and movably mounted to the other of said line and load conductors with said lockable fastener; and wherein said operating mechanism further comprises a first side plate including a first opening, and a second side plate including a second opening; wherein said first member passes through said first opening; and wherein said second member passes trough said second opening.

* * * * *